US007524176B2

(12) United States Patent
Yao

(10) Patent No.: US 7,524,176 B2
(45) Date of Patent: Apr. 28, 2009

(54) NOZZLE FOR APPLYING ADHESIVES

(75) Inventor: Hong Yao, Boonton, NJ (US)

(73) Assignee: Sika Technology AG, Baar (CH)

(*) Notice: Subject to any disclaimer, the term of this patent is extended or adjusted under 35 U.S.C. 154(b) by 254 days.

(21) Appl. No.: 11/154,761

(22) Filed: Jun. 16, 2005

(65) Prior Publication Data

US 2006/0283978 A1 Dec. 21, 2006

(51) Int. Cl.
*B29C 47/12* (2006.01)

(52) U.S. Cl. .................. 425/87; 118/410; 118/DIG. 2; 425/376.1; 425/458; 425/461

(58) Field of Classification Search .................. 425/87, 425/376.1, 458, 461; 118/410, 411, DIG. 2
See application file for complete search history.

(56) References Cited

U.S. PATENT DOCUMENTS

| | | | |
|---|---|---|---|
| 3,575,137 A | | 4/1971 | Marquis |
| 4,785,996 A | | 11/1988 | Ziecker et al. |
| 4,946,081 A | * | 8/1990 | Jacobson .................... 222/568 |
| 5,033,951 A | | 7/1991 | Cook |
| 6,651,906 B2 | | 11/2003 | Saidman |
| 2005/0081784 A1 | | 4/2005 | Sakayori et al. |

FOREIGN PATENT DOCUMENTS

| | | | |
|---|---|---|---|
| DE | 2220813 | | 11/1972 |
| DE | 4406762 | | 9/1995 |
| DE | 102005026125 | | 3/2006 |
| EP | 0367985 | | 1/1995 |
| EP | 1174193 | | 1/2002 |
| EP | 1632293 | | 3/2006 |
| JP | 10015456 A | * | 1/1998 |
| JP | 2001-182836 | * | 7/2001 |

OTHER PUBLICATIONS

International Search Report dated Oct. 19, 2006 for International Application No. PCT/EP2006/063265.

* cited by examiner

*Primary Examiner*—Robert B Davis
*Assistant Examiner*—Joseph Leyson
(74) *Attorney, Agent, or Firm*—Rader, Fishman & Grauer PLLC

(57) ABSTRACT

A nozzle for dispensing adhesives has a body defining a fluid flow passageway between an inlet end and an outlet end. The nozzle has an outlet orifice in a sidewall of the body. The outlet orifice has an upper portion and a base portion separated by a shoulder.

12 Claims, 6 Drawing Sheets

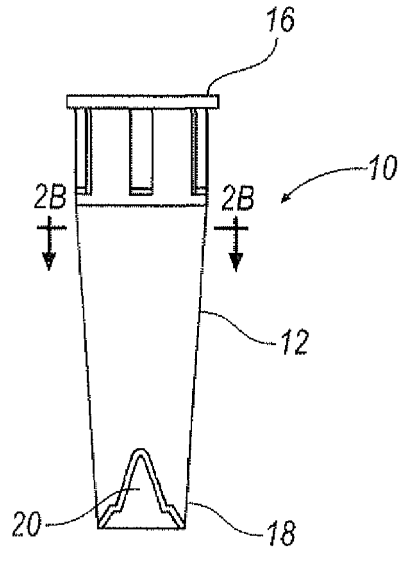
FIG. 2A
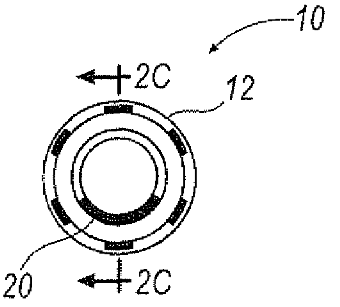
FIG. 2B
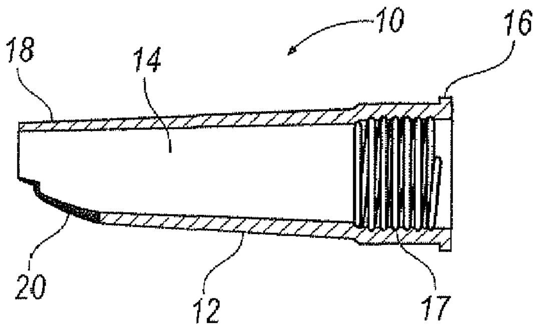
FIG. 2C
FIG. 2D
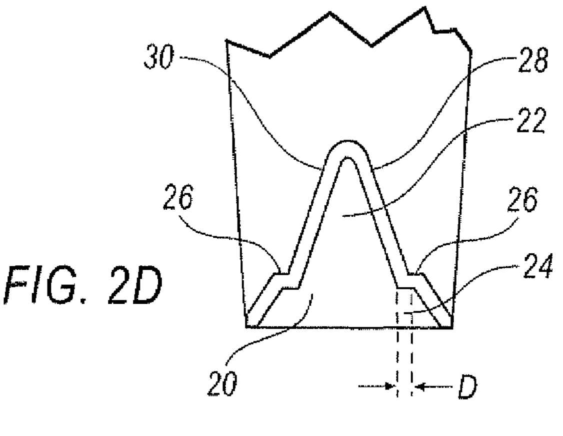

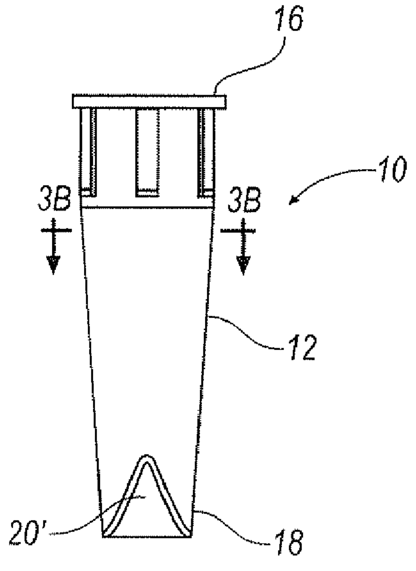
FIG. 3A
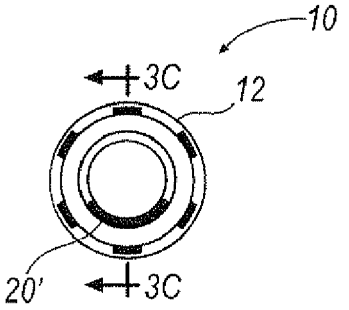
FIG. 3B
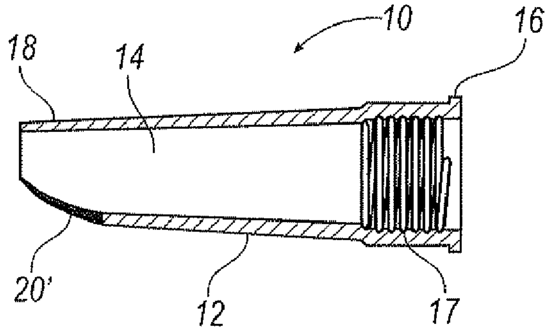
FIG. 3C
FIG. 3D
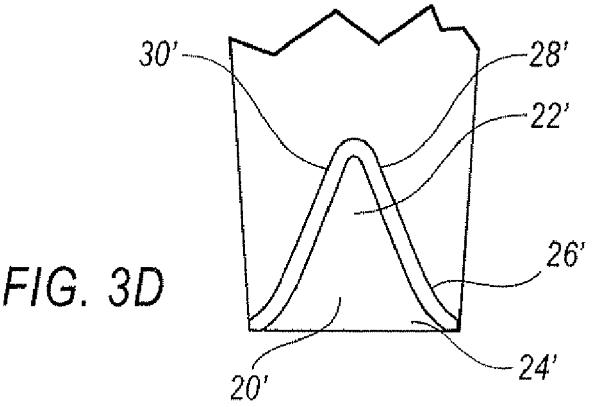

NOZZLE FOR APPLYING ADHESIVES

BACKGROUND

Automotive vehicles have windshields that are typically attached to the vehicle body with an elastic adhesive. Installation of a windshield generally includes, among other things, applying an adhesive bead to either the portion of the vehicle body serving as the frame for the windshield or, alternatively, to a pretreated ceramic coating strip (the "frit") of the glass windshield itself. In either case, it is known to apply the adhesive bead using an adhesive gun or other manual or automatic dispensing device having a dispensing nozzle. After the adhesive bead is applied to the vehicle body or the windshield, as the case may be, the windshield is pressed against the vehicle body so that the adhesive bead is compressed between the windshield and the vehicle body. Ultimately, the adhesive cures to become an elastic rubber, which provides a permanent adhesion between the windshield and the vehicle body.

It is preferable for the dispensed adhesive bead to be triangular-shaped before it is compressed because the relatively wide base of the bead provides a substantial contact area between the adhesive bead and the vehicle or windshield, as the case may be. In known systems, as shown in FIGS. 1A-1C, the triangular-shaped bead is dispensed with a nozzle 2 having a triangular-shaped outlet orifice 4 in the sidewall of the nozzle. FIG. 1B shows the nozzle 2 of FIG. 1A being moved along a path shown by the arrow, which causes a triangular-shaped bead of adhesive 8 to be dispensed from the outlet orifice 4 of the nozzle 2.

After the adhesive bead is applied, the windshield is pressed against the vehicle body, thereby compressing the adhesive bead. FIG. 1C shows the nozzle 2 of FIGS. 1A and 1C along with the profile of an adhesive bead 6 dispensed from the nozzle 2 before it is compressed by pressing the windshield against the vehicle body. FIG. 1C also shows adhesive bead 7, which is the adhesive bead 6 after is has been compressed. As illustrated, the applied pressure causes the triangular-shaped adhesive bead to turn into a trapezoid-shaped bead. In the process, the bottom side 9 of the compressed adhesive bead 7 is wider than the bottom side 5 of the uncompressed adhesive bead 6. As a result, the contact area between the bottom side of the adhesive bead and the windshield or vehicle frame increases during installation of the windshield. The inventor has recognized that it is undesirable to expand the contact area of the adhesive bead after application and during installation of the windshield. Among other things, the inventor has recognized that such expansion may lead to possible loose contact between the adhesive bead and the windshield or vehicle frame, as applicable, and, as a result, a weakened bond at the interface of the adhesive bead.

The embodiments described hereinbelow were developed in light of these and other drawbacks associated with known nozzles for dispensing adhesive beads in windshield installation applications.

SUMMARY

A nozzle for dispensing a bead of adhesive is disclosed. The nozzle has a body having an inlet end, an outlet end, and a fluid flow path extending through the nozzle body between the inlet end and the outlet end. An outlet orifice is disposed in a sidewall of the nozzle body. The outlet orifice has an upper portion and a lower portion, where the upper and lower portions are separated by a shoulder. In some embodiments, the upper portion is substantially triangular-shaped, and the lower portion is substantially trapezoidal-shaped. The lower trapezoidal-shaped portion may have straight or curved side walls.

BRIEF DESCRIPTION OF THE DRAWINGS

The features and inventive aspects of the present invention will become more apparent upon reading the following detailed description, claims, and drawings, of which the following is a brief description:

FIG. 2A is a side view of a nozzle according to a first embodiment;

FIG. 2B is a perspective section view of the nozzle of FIG. 2A taken along section 2B-2B;

FIG. 2C is a cross-sectional view of the nozzle of FIG. 2B, taken along section 2C-2C;

FIG. 2D is an enlarged side view of the outlet orifice portion of the nozzle of FIG. 2A;

FIG. 3A is a side view of a nozzle according to a second embodiment;

FIG. 3B is a perspective section view of the nozzle of FIG. 3A taken along section 3B-3B;

FIG. 3C is a cross-sectional view of the nozzle of FIG. 3B, taken along section 3C-3C;

FIG. 3D is an enlarged side view of the outlet orifice portion of the nozzle of FIG. 3A;

DETAILED DESCRIPTION

Figure 1A:
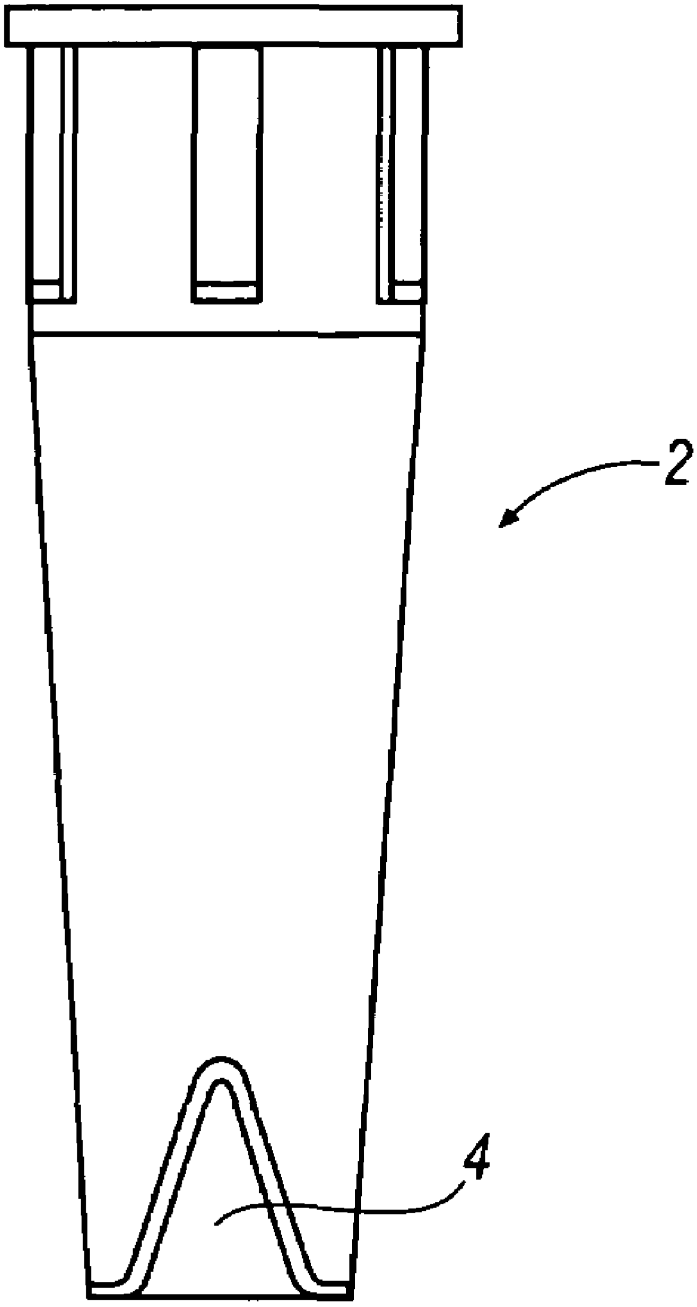
FIG. 1A (PRIOR ART)
FIG. 1A is a side view of a known dispensing nozzle having a triangular-shaped outlet orifice in a sidewall.
Figure 1B:
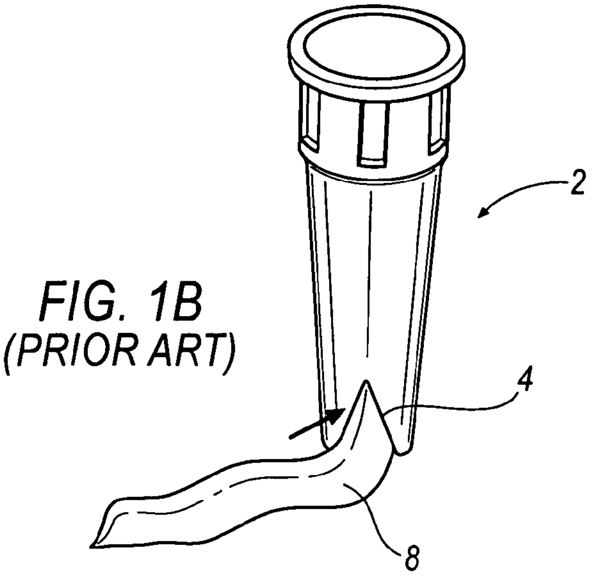
FIG. 1B (PRIOR ART)
FIG. 1B is a perspective view of the nozzle in FIG. 1A, further showing a dispensed bead of adhesive.
Figure 1C:
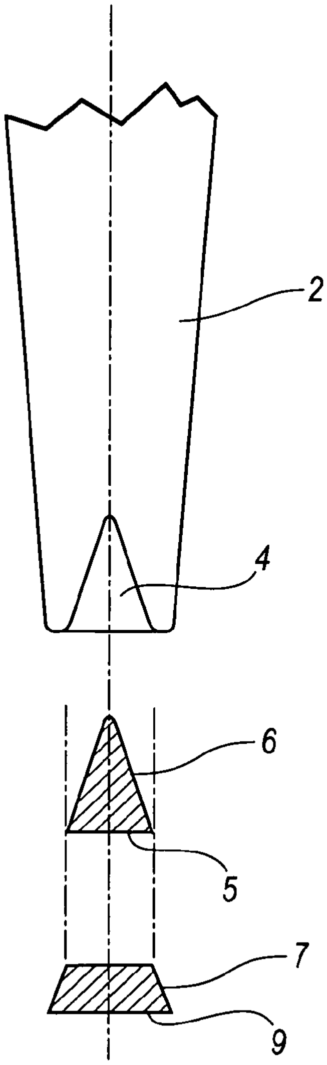
FIG. 1C (PRIOR ART)
FIG. 1C is a side view of the nozzle in FIG. 1A, further showing a cross-sectional view of an adhesive bead dispensed from the nozzle, as well as a cross-sectional view of the adhesive bead after it has been compressed.

FIGS. 2A through 2F illustrate a first embodiment of a nozzle 10 configured to apply a bead of adhesive to a workpiece. As described herein, the nozzle 10 may be used to apply a bead of adhesive to a vehicle windshield or vehicle body (not shown) in connection with the installation of the windshield.

Referring collectively to FIGS. 2A-2F, the nozzle 10 includes a nozzle body 12 having a fluid passageway 14 therein between an inlet end 16 and an outlet end 18 of the nozzle. The nozzle body 12 is generally cylindrical, having a longitudinal axis extending from the inlet end 16 and the outlet end 18. In some embodiments, the diameter of the nozzle body 12 gradually tapers down from the inlet end 16 to the outlet end 18. The inlet end 16 of the nozzle 10 may include threads 17 or other attachment mechanisms for connecting the nozzle 10 to a dispensing gun or other similar device. The nozzle body 12 may be formed from a variety of different materials, including, for example, polyethylene, a plastic, a metallic material, or a polyamide resin.

Figure 2E:
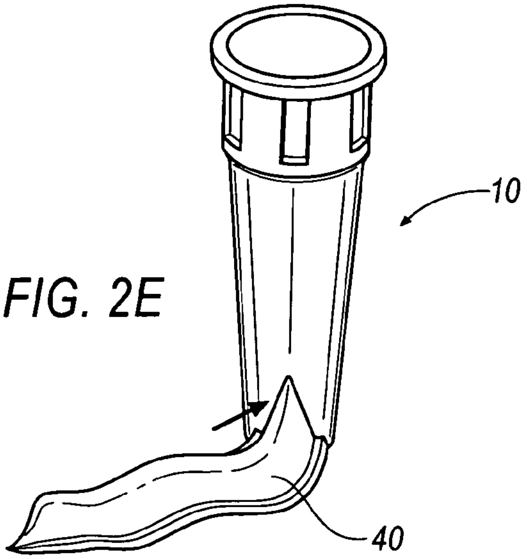
FIG. 2E is a perspective view of the nozzle of FIG. 2A, further showing a dispensed bead of adhesive.
Figure 2F:
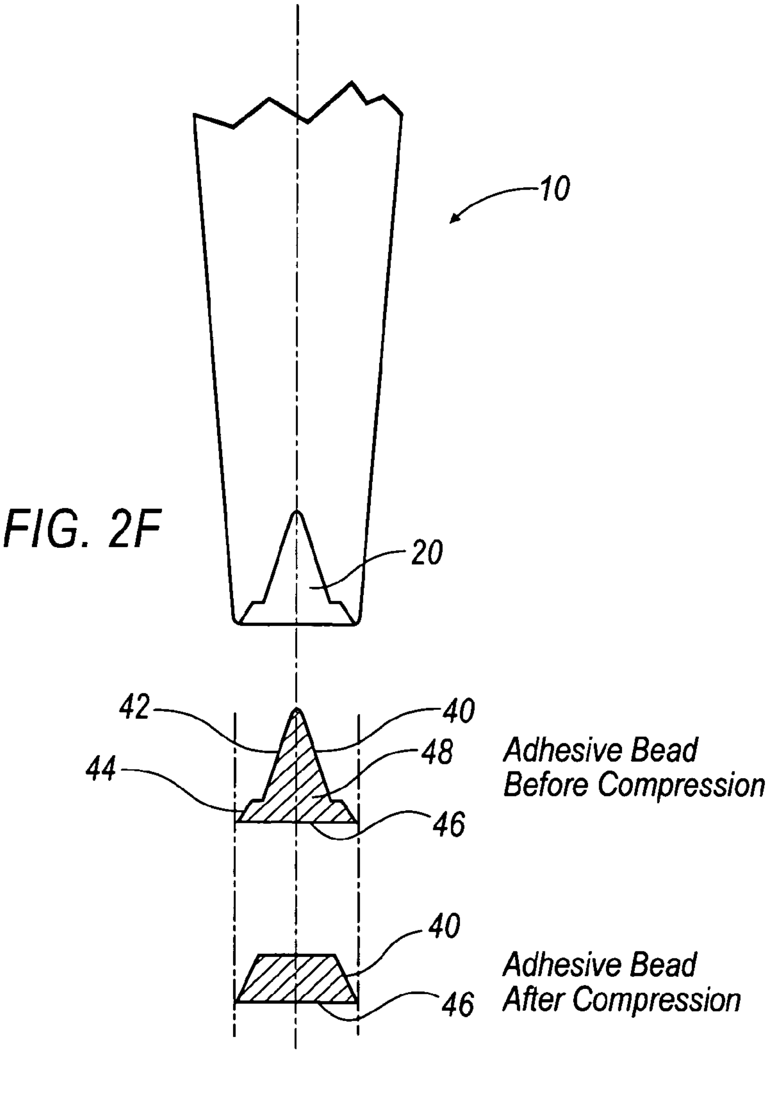
FIG. 2F is a side view of the nozzle in FIG. 2A, further showing a cross-sectional view of an adhesive bead dispensed from the nozzle, as well as a cross-sectional view of the adhesive bead after it has been compressed.

An outlet orifice 20 is disposed in the side wall of the nozzle 10 proximate to the outlet end 18. The outlet orifice 20 is symmetrical about a plane, the plane including the longitudinal axis of the nozzle body 12. as best seen in FIGS. 2A, 2D, and 2F. FIG. 2D shows an enlarged view of the outlet orifice 20. The outlet orifice 20 has an upper portion 22 and a base portion 24, separated by a shoulder 26. Shoulder 26, having an offset distance D, may comprise a substantially horizontal wall (as shown) or it may comprise a substantially non-horizontal wall or it may comprise some other shape. Shoulders 26 may be generally parallel to a bottom side of the base portion 24 or it may be generally non-parallel to a bottom side of the base portion 24. The outlet orifice 20 is symmetrical about a plane extending normal to a bottom side of the base portion 24, the plane including an uppermost point of the orifice 20 and a center point of the bottom side of the base portion 24. as best seen in FIGS. 2A. 2D and 2F. The wall may be straight, as best seen in FIGS. 2A, 2D, and 2F. In any event, shoulder 26 creates a discontinuity in the cross-sectional profile of the outlet orifice 20 between the upper portion 22 and the base portion 24. The upper portion 22 of the outlet orifice is generally triangular-shaped, having sidewalls 28 and 30. The base portion 24 of the outlet orifice is generally trapezoid-shaped, and its upper side abuts the bottom side of the triangular-shaped upper portion 22. The top side of the base portion 24 is wider than the bottom side of the upper portion 22 as a result of the shoulder 26. Together, the upper portion 22 and the base portion 24 are configured to dispense a continuous bead of fluid material having a cross-sectional shape of the outlet orifice 20 when the nozzle is continuously moved over a workpiece, such as a windshield or vehicle body. It is contemplated that other shapes may be employed to form the upper portion 22 and the base portion 24 of the outlet orifice 20.

The above-described nozzle 10 provides an improved cross-sectional shape for an adhesive bead, particularly an adhesive bead that is used in connection with installing vehicle windshields. As illustrated in FIGS. 2E and 2F, the adhesive bead 40 generated by the described nozzle 10 has a generally triangular-shaped upper portion 42 and a generally trapezoidal-shaped base portion 44. The bottom side 46 of the base portion 44 is wider than the bottom side 48 of the upper portion 42. As a result, when the adhesive bead 40 is compressed during installation of a windshield, the bottom side 48 of the upper portion 42 expands, but the bottom side 46 of the base portion 44 generally does not. The bottom side 46 of the base portion 44 stays generally the same size. Accordingly, the interface between the base portion of the adhesive bead and the vehicle body or windshield, as applicable, does not substantially change during compression, which improves the bond strength at the interface of the adhesive bead.

Figure 3E:
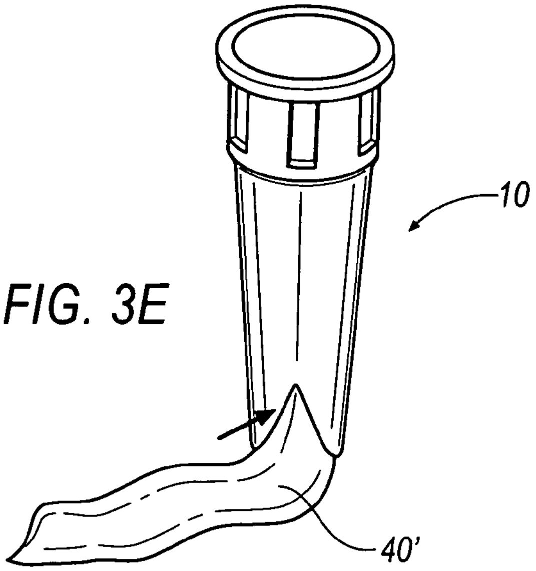
FIG. 3E is a perspective view of the nozzle of FIG. 3A, further showing a dispensed bead of adhesive.

Now referring collectively to FIGS. 3A-3F, a second embodiment of the nozzle 10 is shown configured to apply the bead of adhesive to the workpiece. Similar features of the embodiments shown in FIGS. 2A-2F and FIGS. 3A-3F have similar reference numbers. In FIGS. 3A-3F, an outlet orifice 20' is disposed in the side wall of the nozzle 10 proximate to the outlet end 18. FIG. 3D shows an enlarged view of the outlet orifice 20'. The outlet orifice 20' has an upper portion 22' and a base portion 24', separated by a curved shoulder 26'. Curved shoulder 26' creates a discontinuity in the cross-sectional profile of the outlet orifice 20' between the upper portion 22' and the base portion 24'. The upper portion 22' of the outlet orifice 20' is generally triangular-shaped, having sidewalls 28' and 30'. Sidewalls 28' and 30' of the upper portion 22' are shown linear but may also be curved. The base portion 24' of the outlet orifice is generally trapezoid-shaped, but, instead of straight walls, the walls of the base portion 24' are curved. The curved side of the base portion abuts the bottom side of the triangular-shaped upper portion 22'. The upper side of the base portion 24' is generally the same circumferential extent as the bottom side of the upper portion 22'. Together, the upper portion 22' and the base portion 24' are configured to dispense a continuous bead of fluid material having a cross-sectional shape of the outlet orifice 20' when the nozzle is continuously moved over a workpiece, such as a windshield or vehicle body.

Figure 3F:
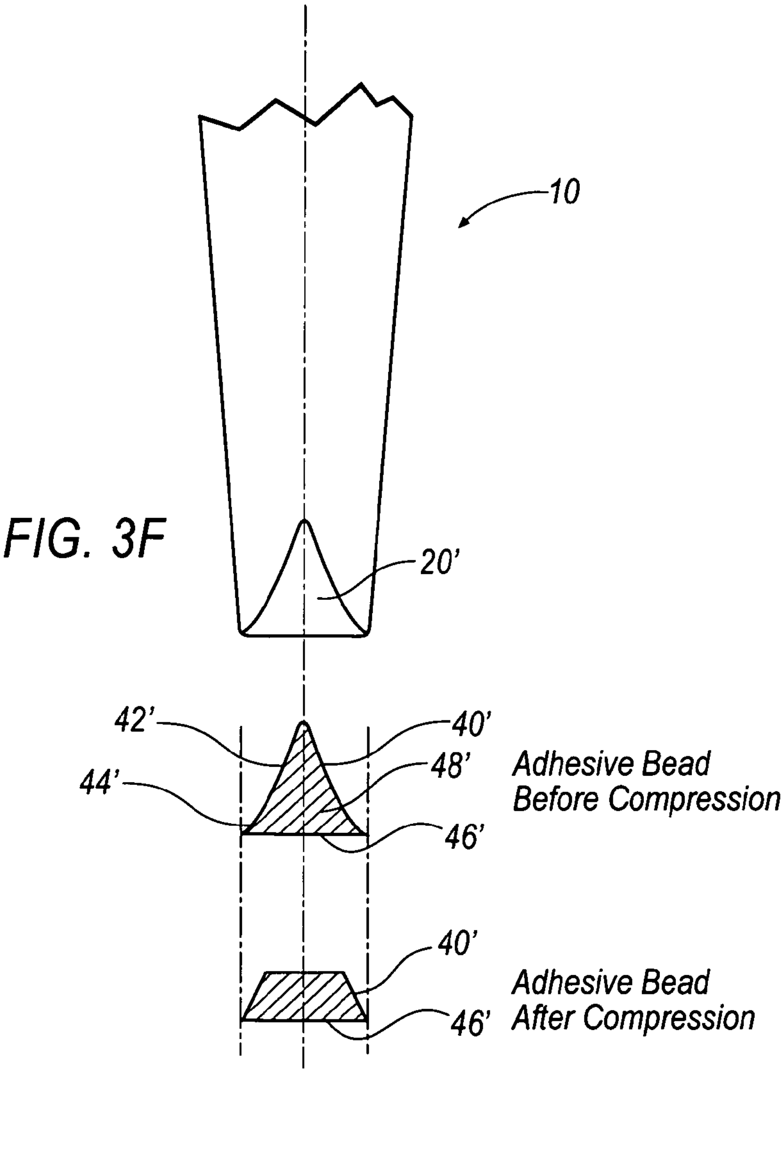
FIG. 3F is a side view of the nozzle in FIG. 3A, further showing a cross-sectional view of an adhesive bead dispensed from the nozzle, as well as a cross-sectional view of the adhesive bead after it has been compressed.

The above-described nozzle 10 provides an improved cross-sectional shape for an adhesive bead, particularly an adhesive bead that is used in connection with installing vehicle windshields. As illustrated in FIGS. 3E and 3F, the adhesive bead 40' generated by the described nozzle 10 has a generally triangular-shaped upper portion 42' and a generally trapezoidal-shaped base portion 44'. The bottom side 46' of the base portion 44' is wider than the bottom side 48' of the upper portion 42'. As a result, when the adhesive bead 40' is compressed during installation of a windshield, the bottom side 48' of the upper portion 42' expands, but the bottom side 46' of the base portion 44' generally does not. The bottom side 46' of the base portion 44' generally stays the same size.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, may modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A nozzle for dispensing adhesives, comprising:

a body defining a fluid flow passageway between an inlet end and an outlet end, said body having a longitudinal axis extending between said inlet end and said outlet end; and an outlet orifice in a sidewall of said body, said outlet orifice having an upper portion and a base portion separated by first and second shoulders, said outlet orifice being symmetrical about a plane, said plane including said longitudinal axis;

wherein said first and second shoulders are disposed on opposite sides of said plane, said first shoulder including a first straight wall, said second shoulder including a second straight wall, said first and second straight walls being one of substantially horizontal and generally parallel to a bottom side of said base portion.

2. The nozzle of claim 1, wherein said upper portion is generally triangular.

3. The nozzle of claim 1, wherein said base portion is generally trapezoidal.

4. The nozzle of claim 1, wherein said shoulders are generally parallel to said bottom side of said base portion.

5. The nozzle of claim 1, wherein said shoulders are substantially horizontal and generally non-parallel to said bottom side of said base portion.

6. The nozzle of claim 1, wherein said bottom side of said base portion is wider than a bottom side of said upper portion.

7. The nozzle of claim 1, wherein a top side of said base portion is wider than a bottom side of said upper portion.

8. The nozzle of claim 1, wherein said first and second straight walls are generally parallel to a bottom side of said base portion.

9. The nozzle of claim 1, wherein said first and second straight walls are substantially horizontal.

10. A nozzle for dispensing adhesives, comprising:

a body defining a fluid flow passageway between an inlet end and an outlet end; and an outlet orifice in a sidewall of said body, said outlet orifice having an upper portion and a base portion separated by first and second shoulders, said outlet orifice being symmetrical about a plane extending normal to a bottom side of said base portion, said plane including an uppermost point of said orifice and a center point of said bottom side of said base portion;

wherein said first and second shoulders are disposed on opposite sides of said plane, said first shoulder including a first straight wall, said second shoulder including a second straight wall, said first and second straight walls being one of substantially horizontal and generally parallel to said bottom side of said base portion.

11. The nozzle of claim 10, wherein said first and second straight walls are generally parallel to bottom side of said base portion.

12. The nozzle of claim 10, wherein said first and second straight walls are substantially horizontal.

* * * * *

UNITED STATES PATENT AND TRADEMARK OFFICE

CERTIFICATE OF CORRECTION

PATENT NO. : 7,524,176 B2
APPLICATION NO. : 11/154761
DATED : April 28, 2009
INVENTOR(S) : Hong Yao It is certified that error appears in the above-identified patent and that said Letters Patent is hereby corrected as shown below:

Col. 6 in claim 11, line 13, please insert the word --said-- in the following location “straight walls are generally parallel to said bottom side of said base.”

Signed and Sealed this

Twenty-first Day of July, 2009

JOHN DOLL
*Acting Director of the United States Patent and Trademark Office*